H. E. WHITING.
AIR PURIFYING DEVICE FOR AUTOMOBILES.
APPLICATION FILED MAR. 4, 1908.
903,122.
Patented Nov. 3, 1908.
2 SHEETS—SHEET 1.
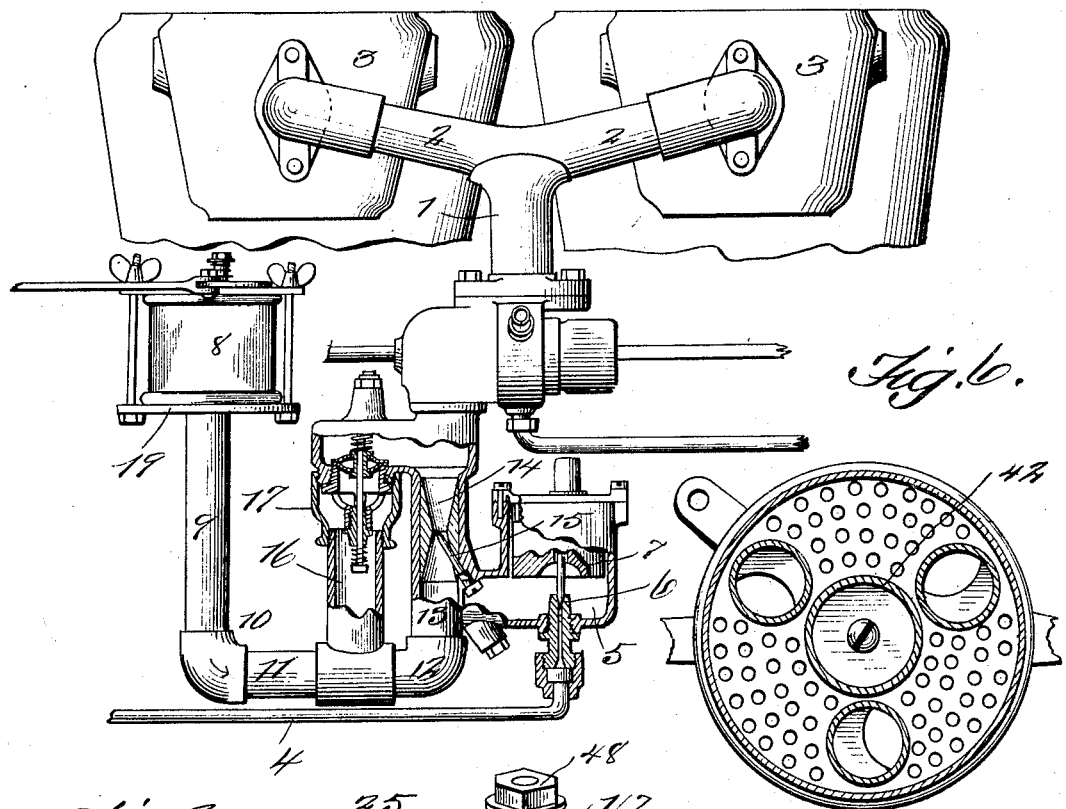

H. E. WHITING.
AIR PURIFYING DEVICE FOR AUTOMOBILES.
APPLICATION FILED MAR. 4, 1908.
903,122.
Patented Nov. 3, 1908.
2 SHEETS—SHEET 2.
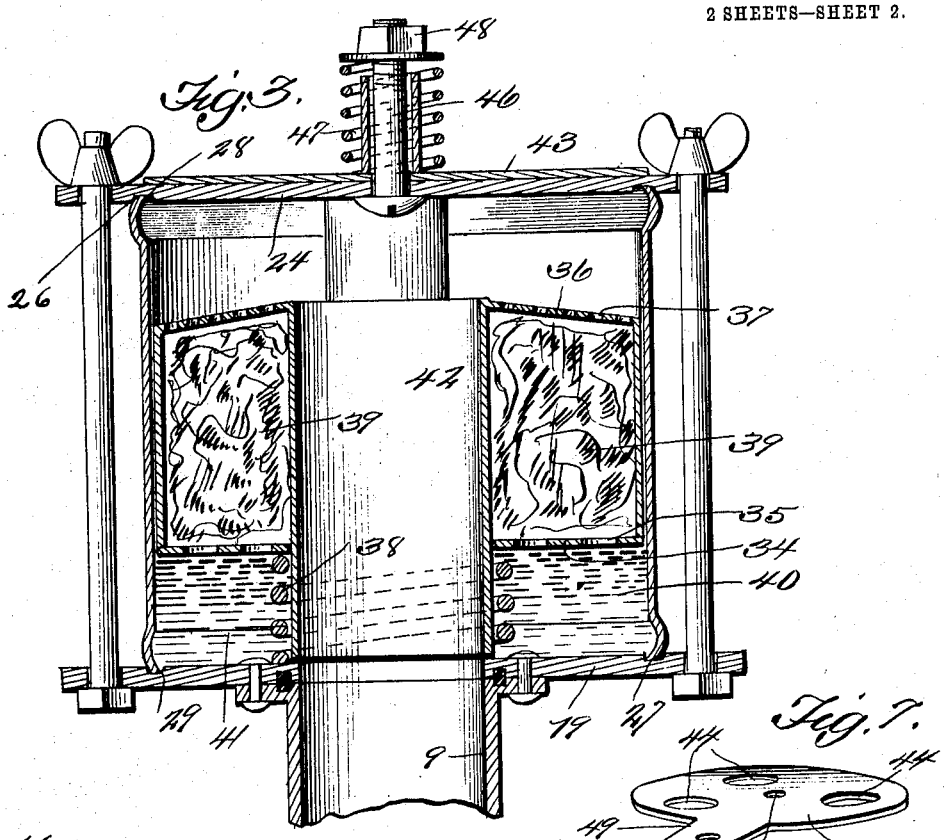
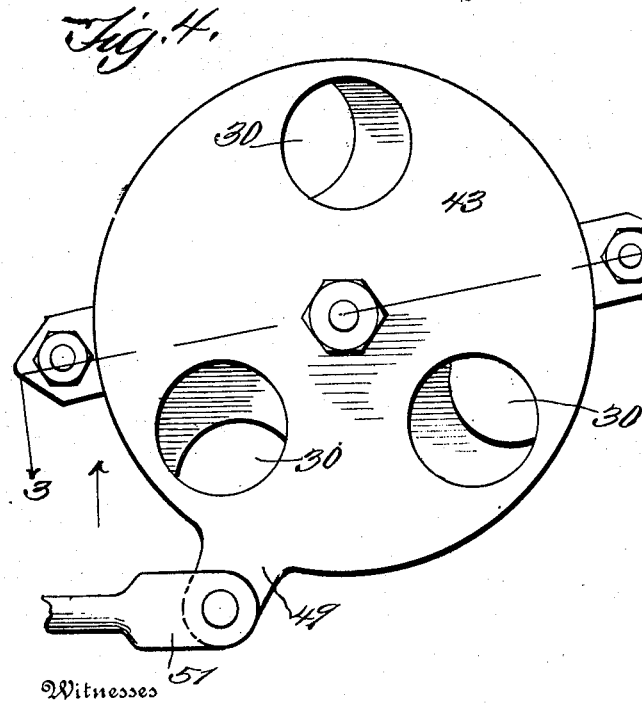
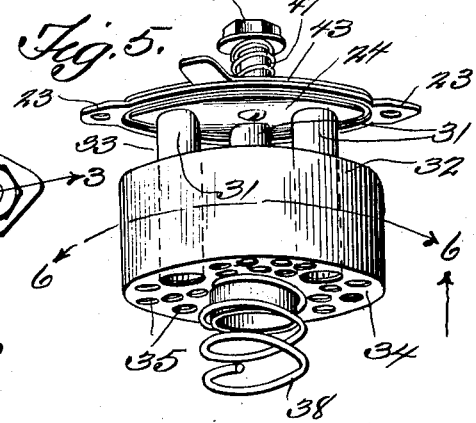
Witnesses
R. H. Boswell.
A. M. Whitmore.
Inventor
H. E. Whiting,
By Enos B. Whitmore,
Attorney

UNITED STATES PATENT OFFICE.

HERMAN E. WHITING, OF PALMYRA, NEW YORK, ASSIGNOR OF ONE-HALF TO OLIN J. GARLOCK, OF PALMYRA, NEW YORK.

AIR-PURIFYING DEVICE FOR AUTOMOBILES.

No. 903,122.  Specification of Letters Patent.  Patented Nov. 3, 1908.

Application filed March 4, 1908. Serial No. 419,192.

*To all whom it may concern:*

Be it known that I, HERMAN E. WHITING, of Palmyra, in the county of Wayne and State of New York, have invented a new and useful Improvement in Air-Purifying Devices for Automobiles, which improvement is fully set forth in the following specification and shown in the accompanying drawings.

This invention relates to certain new and useful improvements in air sifters or purifiers for automobile carbureters, and it has for its objects among others to provide a simple and efficient air purifier or filter by which the dust and all extraneous matter is removed from the air before the passage of the latter into the carbureter, thus keeping all foreign matter out of the cylinders, preventing false firing and thus keeping the parts in condition for longer wear and use. I provide an air filter or strainer for this purpose provided with a dust-catching fluid beneath a perforated plate so that when the air laden with the dust and other foreign substances passes into the device it will impinge directly against the fluid and leave therein a large portion of the extraneous matter carried by such air so that only a remnant of the dust is caught by the filtering fiber or material within the inner chamber. This prevents the filtering material from becoming too quickly clogged with dust and hence longer runs may be made with the machine.

Other objects and advantages of the invention will hereinafter appear and the novel features thereof will be particularly pointed out in the appended claims.

The invention is clearly illustrated in the accompanying drawings which, with the numerals of reference marked thereon, form a part of this invention, and in which Figure 1 is a diagrammatic view with portions broken away and parts in section showing the application of my present invention. Fig. 2 is a perspective view of the air purifier or strainer. Fig. 3 is a substantially central vertical section on the line 3—3 of Fig. 4. Fig. 4 is a top plan. Fig. 5 is a perspective view of the device with the casing and bottom plate removed. Fig. 6 is a cross section on the line 6—6 of Fig. 5 looking in the direction of the arrow. Fig. 7 is a perspective view of the regulating plate or disk.

Like numerals of reference indicate like parts throughout the several views.

Referring to the drawings 1 designates the gas inlet pipe in this instance shown as branched, as at 2, 2, and said branches leading to the cylinders 3, 3. 4 is the feed pipe from a suitable source of supply of gasolene and leading to the float chamber 5 containing the needle valve 6 and float 7 and operating in the usual manner. These parts and all others not herein specifically described may be of any of the well known or approved forms of construction, and unless specifically mentioned in the claims form no part of the present invention.

My present invention pertains particularly to the air purifier or strainer designated as a whole by the numeral 8.

9 is a pipe through which the purified air passes, downward through the elbow 10 and pipe 11 to the carbureter which latter is of known construction. The pipe 11 in this instance is provided with the elbow 12 from which rises the pipe 13 within which is the chamber 14 which is contracted near its middle, being tapered in opposite directions from such point of contraction, as seen clearly in Fig. 1.

15 is the spray plug leading from the float chamber, as shown in Fig. 1, the pipe 9 being substantially one and a half times in cross section the area of the reduced passage in this chamber through which the spray passes. From the pipe 11 extends the pipe 16 which is shown as connected with the coupling 17 leading to an auxiliary air inlet, this pipe, however, may be omitted without in any wise affecting the operation or advantages of the present invention. It is thought that the above is sufficient to enable one to understand the application of the invention, a detailed description of which will now be given.

The air filter or strainer comprises a casing 18 having a floor or bottom circular plate 19 having lugs 20 for the reception of vertical bolts 21 which pass therethrough and provided with heads or the like 22 engaging the underside of said lugs, the upper ends of said bolts passing through openings in the lugs or ears 23 on the cover or top plate 24 and receiving the thumb nuts 25, as seen best in Fig. 2. By this means the parts are firmly secured together, the top and bottom plates having annular grooves 26 and 27 respectively, as seen best in Fig. 3, into which the inwardly extending end portions 28 and 29 of the casing fit so as to form tight joints.

The top plate 24 is provided with a plurality of openings, in this instance three as shown at 30, and depending from this top plate in line with and communicating with said openings are the depending tubes or pipes 31. These tubes or pipes extend through and are connected with the chamber 32, the top of which is disposed at a distance from the underside of the top plate, as seen best in Fig. 5, to leave a space 33 therebetween, for a purpose which will be hereinafter made apparent. The bottom 34 of this chamber is provided with perforations 35 and the top 36 is provided with perforations 37 which are materially smaller than the perforations of the lower plate, as seen best in Fig. 3. This lower plate 34 is disconnected and removable from the surrounding wall of the chamber, being fitted snugly over the lower ends of the tubes or pipes 31, and is held firmly in place by means of a stiff spiral spring 38 which bears upward thereagainst and against the bottom plate 19 so as to keep this lower perforated plate of the fiber chamber firmly pressed up into place, doing away with screws or other extraneous means for holding the parts in place and allowing of ready separation of the parts when it is desired to clean the chamber or to renew the fiber or filtering material therein. This filtering material 39 may be of cotton or wool fiber, sponge or any other suitable material that will filter the air so as to remove therefrom the dust or other foreign substances. Within the chamber 40 interposed between the lower perforated plate and the bottom plate 19 I may place glycerin, an oil, or any viscous fluid or suitable material that evaporates slowly and serves to catch or retain the dust or extraneous matter in the air so that but a small portion of such extraneous matter is carried to the filtering material.

Within the inner chamber is the central or coaxial tube 42, as seen clearly in Figs. 3 and 6, and with which the pipe 9 communicates. Any suitable form of connection between these pipes may be employed that will give an air tight joint. One convenient form is seen in Fig. 3.

The openings 30 in the top plate through which the air is admitted are regulated by a movable plate 43, shown detached in Fig. 7, and having openings 44 corresponding in number to those in the top plate. This movable plate 43 is provided with a central opening 45 which receives the bolt 46 secured centrally to the top plate, a suitable spring 47 being provided around such bolt and the latter provided with a nut 48 by which tension on the spring may be regulated, the spring serving to moderately press the movable plate against the top plate, as will be understood from Fig. 2. This movable plate is provided with a lateral lug 49 having an opening 50 for attachment to an arm or lever 51 by means of which the said plate may be rotated to regulate the size of the intake openings.

The operation will be readily understood:—The atmospheric air carrying dust and other extraneous matter or substances passes in through the intake openings 30 at the top of the strainer and passes downwardly through the tubes 31 into the chamber 40. The air in its downward passage impinges directly against the glycerin or other dust-catching fluid, leaving in the latter a large portion of the extraneous matter carried by such air so that only a very small remnant of the dust remains to be caught by the filtering fiber or material in the inner chamber. This will prevent the fiber from too quickly becoming clogged with the dust so that the life thereof is materially lengthened and much longer runs may be made with the auto. The air thence passes up through the lowermost perforations and through the body of the dust-catching fiber and through the smaller perforations at the top of the fiber chamber, and thence again downward through the main central tube 42, through the elbow 10, pipe 11, elbow 12 and contracted chamber 14 to the carbureter. By removing the thumb nuts 25, the top plate, the controller plate and the parts carried thereby may all be bodily removed, as seen in Fig. 5, when the bottom plate 34 can be easily removed, to provide access to the inner chamber so that the filtering fiber therein may be removed and new fiber put in its place.

Modifications may be resorted to without departing from the spirit of the invention or sacrificing any of its advantages.

What is claimed as new is:—

1. An air purifying device for carbureters, the same comprising a casing having therein a dust-catching fluid, a fibrous body and a spring pressed removable perforated plate separating the two.

2. In an air purifying device for carbureters, a chamber having intake openings, a chamber containing a dust-catching fluid in direct communication with said openings, an inner chamber having a dust-catching filling, and a spring pressed removable perforated plate between the said chambers.

3. In an air purifying device for carbureters, a chamber having intake openings, a chamber containing a dust-catching fluid in direct communication with said openings, an inner chamber having a dust-catching filling, a spring pressed removable perforated plate between the said chambers, and means for regulating the capacity of the intake openings.

4. In an air purifying device for carbureters, a casing having intake openings, tubes communicating therewith, a chamber through which said tubes pass, perforated top and bottom plates for said chamber, the latter being removable and spring pressed, a dust-catching filling in said chamber, and a chamber within said casing beneath the first-mentioned chamber and containing a dust-catching fluid.

5. In an air purifying device for carbureters, a casing having intake openings, tubes communicating therewith, a chamber through which said tubes pass, perforated top and bottom plates for said chamber, the latter being removable and spring pressed, a dust-catching filling in said chamber, a chamber within said casing beneath the first-mentioned chamber and containing a dust-catching fluid, and a coaxial tube through said chamber.

6. In a device of the character described, a top plate having intake openings, tubes depending therefrom, a chamber supported by said tubes with a space between the top of said chamber and the top plate, and a removable spring pressed bottom for said chamber.

7. In a device of the character described, a top plate having intake openings, tubes depending therefrom, a chamber supported by said tubes with a space between the top of said chamber and the top plate, and a removable spring pressed bottom for said chamber, said bottom plate having perforations.

8. In a device of the character described, a top plate having intake openings, tubes depending therefrom, a chamber supported by said tubes with a space between the top of said chamber and the top plate, a removable spring pressed bottom for said chamber, said bottom plate having perforations and the top plate of said chamber also having perforations.

9. In a device of the character described, a top plate having intake openings, tubes depending therefrom, a chamber supported by said tubes with a space between the top of said chamber and the top plate, and a removable spring pressed bottom for said chamber, said bottom plate having perforations and the top plate of said chamber also having perforations, the perforations of the top of the chamber being smaller than those of the bottom thereof.

10. In a device of the character described, a top plate having intake openings, tubes depending therefrom, a chamber supported by said tubes with a space between the top of said chamber and the top plate, a removable spring pressed bottom for said chamber, said bottom plate having perforations and the top plate of said chamber also having perforations, the perforations of the top of the chamber being smaller than those of the bottom thereof, and a plate for controlling the intake openings.

11. In a device of the character described, a casing having a bottom plate with coaxial opening and a top plate with intake openings, tubes depending from said top plate, and a chamber through which said tubes pass and by which tubes it is supported, said chamber having a removable perforated bottom, and all removable with said top plate.

12. In a device of the character described, a casing having a bottom plate with coaxial opening and a top plate with intake openings, tubes depending from said top plate, a chamber through which said tubes pass and by which tubes it is supported, said chamber having a removable perforated bottom, and all removable with said top plate, and means removable with the top plate for controlling said intake openings.

13. In a device of the character described, a casing having a bottom plate with coaxial opening and a top plate with intake openings, tubes depending from said top plate, a chamber through which said tubes pass and by which tubes it is supported, said chamber having a removable perforated bottom, and all removable with said top plate, and a spring acting against said perforated bottom.

14. In a device of the character described, a casing having a bottom plate with coaxial opening and a top plate with intake openings, tubes depending from said top plate, a chamber through which said tubes pass and by which tubes it is supported, said chamber having a removable perforated bottom, and all removable with said top plate, means removable with the top plate for controlling said intake openings, and a spring pressing against said controlling means.

15. In a device of the character described, a casing having a bottom plate with coaxial opening and a top plate with intake openings, tubes depending from said top plate, a chamber through which said tubes pass and by which tubes it is supported, said chamber having a removable perforated bottom, and all removable with said top plate, means removable with the top plate for controlling said intake openings, a spring pressing against said controlling means, and a spring acting upon said perforated bottom to force it upward.

16. In a device of the character described, top and bottom plates having annular grooves in their adjacent faces, a cylinder or casing having its ends received in said grooves, means connecting the top and bottom plates for holding them together to form a tight joint with the casing, and a chamber and intake pipes secured to and removable with the top plate.

17. In a device of the character described, top and bottom plates having annular grooves in their adjacent faces, a cylinder or casing having its ends received in said grooves, means connecting the top and bottom plates for holding them together to form a tight joint with the casing, and a chamber and intake pipes secured to and removable with the top plate, said chamber having a removable perforated bottom.

In witness whereof, I have hereunto set my hand this 27th day of February, 1908, in the presence of two subscribing witnesses.

HERMAN E. WHITING.

Witnesses:
    JOHN L. TRAVERS,
    JOSEPH A. KENVILLE.